(12) United States Patent
Sundararajan et al.

(10) Patent No.: US 7,793,258 B2
(45) Date of Patent: Sep. 7, 2010

(54) SOFTWARE DEVELOPMENT USING VISUAL INTERFACES

(75) Inventors: Parthasarathy Sundararajan, Chennai (IN); Krishnamoorthy Meenakshisundaram, Chennai (IN); Srinivasan Ramaswamy, Chennai (IN); Raghuram Devalla, Chennai (IN); Kannappan Gopalsamy, Chennai (IN); Krishnan Natarajan, Chennai (IN); Subramanian Seetharaman, Chennai (IN); Shyamala Jayaraman, Chennai (IN); Venkatasubramanian Ramaratnam, Chennai (IN)

(73) Assignee: Ramco Systems Limited, Chennai, Tamilnadu (IN)

( * ) Notice: Subject to any disclaimer, the term of this patent is extended or adjusted under 35 U.S.C. 154(b) by 1066 days.

(21) Appl. No.: 11/029,876

(22) Filed: Jan. 5, 2005

(65) Prior Publication Data

US 2005/0203764 A1    Sep. 15, 2005

Related U.S. Application Data

(60) Provisional application No. 60/553,087, filed on Mar. 15, 2004, provisional application No. 60/553,256, filed on Mar. 15, 2004, provisional application No. 60/553,352, filed on Mar. 15, 2004, provisional application No. 60/553,470, filed on Mar. 16, 2004, provisional application No. 60/553,261, filed on Mar. 15, 2004, provisional application No. 60/553,465, filed on Mar. 16, 2004, provisional application No. 60/553,232, filed on Mar. 15, 2004, provisional application No. 60/553,466, filed on Mar. 16, 2004, provisional application No. 60/553,469, filed on Mar. 16, 2004.

(51) Int. Cl.
*G06F 3/00* (2006.01)
*G06F 3/048* (2006.01)
*G06F 9/44* (2006.01)

(52) U.S. Cl. .......... 717/109; 717/104; 717/105; 717/106; 717/107; 717/108; 715/762; 715/763

(58) Field of Classification Search ............ 717/101, 717/102, 103, 105, 109, 113, 123; 715/763, 715/703

See application file for complete search history.

(56) References Cited

U.S. PATENT DOCUMENTS 5,729,746 A * 3/1998 Leonard .......... 717/101

(Continued)

OTHER PUBLICATIONS

Akerley J et al, Programming with Visual Age for JavaVersion2, Internet Citation, [Online], Nov. 1998, XP002150550, Retrieved from the Internet : URL: http://www7.software.ibm.com/vadd-bin/ftpdl?1/vadc/redbooks/sg245264.pdf, Retrieved on Oct. 19, 2000, p. 112, line11-p. 122, last line.

*Primary Examiner*—Insun Kang
(74) *Attorney, Agent, or Firm*—Prakash Nama; Global IP Services, PLLC

(57) ABSTRACT

A method and system of a software development using visual action elements is disclosed. In one embodiment, the method includes providing a user interface with action elements, and providing a mechanism for specification and review of the action elements using the user interface. For example, providing a user interface includes providing a prototype of the user interface in a web browser and providing a mechanism for specification and review includes providing a toolbar with functionality to record user comments regarding the action elements. The method may also include providing a user interface to document the user interface. The method may further include providing an animated view of stimulus response behavior of the action elements.

13 Claims, 8 Drawing Sheets

U.S. PATENT DOCUMENTS

| | | |
|---|---|---|
| 6,199,199 B1 | 3/2001 | Johnston et al. |
| 6,681,383 B1 * | 1/2004 | Pastor et al. ................ 717/126 |
| 6,789,252 B1 * | 9/2004 | Burke et al. ................ 717/100 |
| 7,191,429 B2 * | 3/2007 | Brassard et al. ............ 717/104 |
| 7,228,524 B2 * | 6/2007 | Bailey et al. ................ 717/100 |
| 2003/0028579 A1 * | 2/2003 | Kulkarni et al. ............ 709/100 |
| 2004/0216045 A1 * | 10/2004 | Martin et al. ............... 715/530 |
| 2004/0255265 A1 * | 12/2004 | Brown et al. ................ 717/101 |
| 2005/0065970 A1 * | 3/2005 | King et al. .................. 707/102 |
| 2005/0097462 A1 * | 5/2005 | Lumera et al. .............. 715/522 |
| 2005/0108699 A1 * | 5/2005 | Olander et al. .............. 717/166 |
| 2007/0050340 A1 * | 3/2007 | von Kaenel et al. ........... 707/3 |
| 2007/0124724 A1 * | 5/2007 | Irani .......................... 717/106 |
| 2007/0168907 A1 * | 7/2007 | Iborra et al. ................ 717/100 |
| 2007/0271554 A1 * | 11/2007 | Fletcher et al. ............. 717/147 |

\* cited by examiner

SOFTWARE DEVELOPMENT USING VISUAL INTERFACES

RELATED APPLICATIONS

Benefit is claimed under 35 U.S.C. 119(e) to U.S. Provisional Application Ser. No. 60/553,087, entitled "Approach for representing business architecture for information systems" by Sundararajan et al., filed Mar. 15, 2004, which is herein incorporated in its entirety by reference for all purposes.

Benefit is also claimed under 35 U.S.C. 119(e) to U.S. Provisional Application Ser. No. 60/553,256, "Approach for representing technical architecture" by Sundararajan et al., filed Mar. 15, 2004, which is incorporated herein by reference for all purposes.

Benefit is also claimed under 35 U.S.C. 119(e) to U.S. Provisional Application Ser. No. 60/553,352, "Mapping business and technical architecture elements to implementation technologies" by Sundararajan et al., filed Mar. 15, 2004, which is incorporated herein by reference for all purposes.

Benefit is also claimed under 35 U.S.C. 119(e) to U.S. Provisional Application Ser. No. 60/553,470, "Schema for storing integrated software specification" by Sundararajan et al., filed Mar. 16, 2004, which is incorporated herein by reference for all purposes.

Benefit is also claimed under 35 U.S.C. 119(e) to U.S. Provisional Application Ser. No. 60/553,261, "An approach to review and manage software requirements using video streaming tools" by Sundararajan et al., filed Mar. 15, 2004, which is incorporated herein by reference for all purposes.

Benefit is also claimed under 35 U.S.C. 119(e) to U.S. Provisional Application Ser. No. 60/553,465, "Interactive approach to involve users in reviewing user interface behavior" by Ramaswamy et al., filed Mar. 16, 2004, which is incorporated herein by reference for all purposes.

Benefit is also claimed under 35 U.S.C. 119(e) to U.S. Provisional Application Ser. No. 60/553,232, "A formal approach to high level business process requirements gathering" by Sundararajan et al., filed Mar. 15, 2004, which is incorporated herein by reference for all purposes.

Benefit is also claimed under 35 U.S.C. 119(e) to U.S. Provisional Application Ser. No. 60/553,466, "Delivering software documentation according to organisational standards" by Ramaswamy et al., filed Mar. 16, 2004, which is incorporated herein by reference for all purposes.

Benefit is also claimed under 35 U.S.C. 119(e) to U.S. Provisional Application Ser. No. 60/553,469, "Software specification and review through visual interfaces" by Sundararajan et al., filed Mar. 16, 2004, which is incorporated herein by reference for all purposes.

FIELD OF THE INVENTION

This invention relates to the field of software engineering, and more specifically to a method and apparatus to gather and review requirements, specifications, interfaces, documentation, and other elements of an information system over the various phases of the information system's life cycle.

BACKGROUND OF THE INVENTION

Software specification and generation through pictures is a longstanding and cherished goal in software engineering. This approach generally appeals to software professionals and users, in part because it promises to render the ethereal nature of software creation related activities into a visual exercise.

Some previous attempts to create a visual approach to software engineering have used diagram conventions such as sequence diagrams and flow charts to represent and specify software structures with varying levels of success. Some outstanding issues that may not be adequately addressed include: (1) the diagrammatic conventions bear little or no resemblance to the look and feel of the eventual software delivered; (2) users do not see a progression in realizing functioning software through what will be delivered to them; and (3) software professionals have to visualize and specify the expected behavior using different conventions. These outstanding issues, and others, have historically reduced the practical applicability of diagrams and pictures in software engineering.

Further, most of the available tools for developing and implementing enterprise applications deal with the syntax of the requirements and keep the semantics of behavior very loosely coupled. These do not enforce any translation semantics when the high level specifications are used during different stages of a software development life cycle (SDLC). This leads to a high degree of information leakage at different stages of the software lifecycle development process. Such information leakage results in the development of an application that is not in tune with the high level requirements that were envisaged in the initial stages of the development. This results in costly rework, both in terms of cost and schedule, at later stages of the SDLC. There is a need for having a formal method for capturing the business requirements that ensure strong semantic relationship across the different entities associated with the requirements and the eventual software artifacts implementing the same.

DESCRIPTION OF PREFERRED EMBODIMENTS

Figure 1:
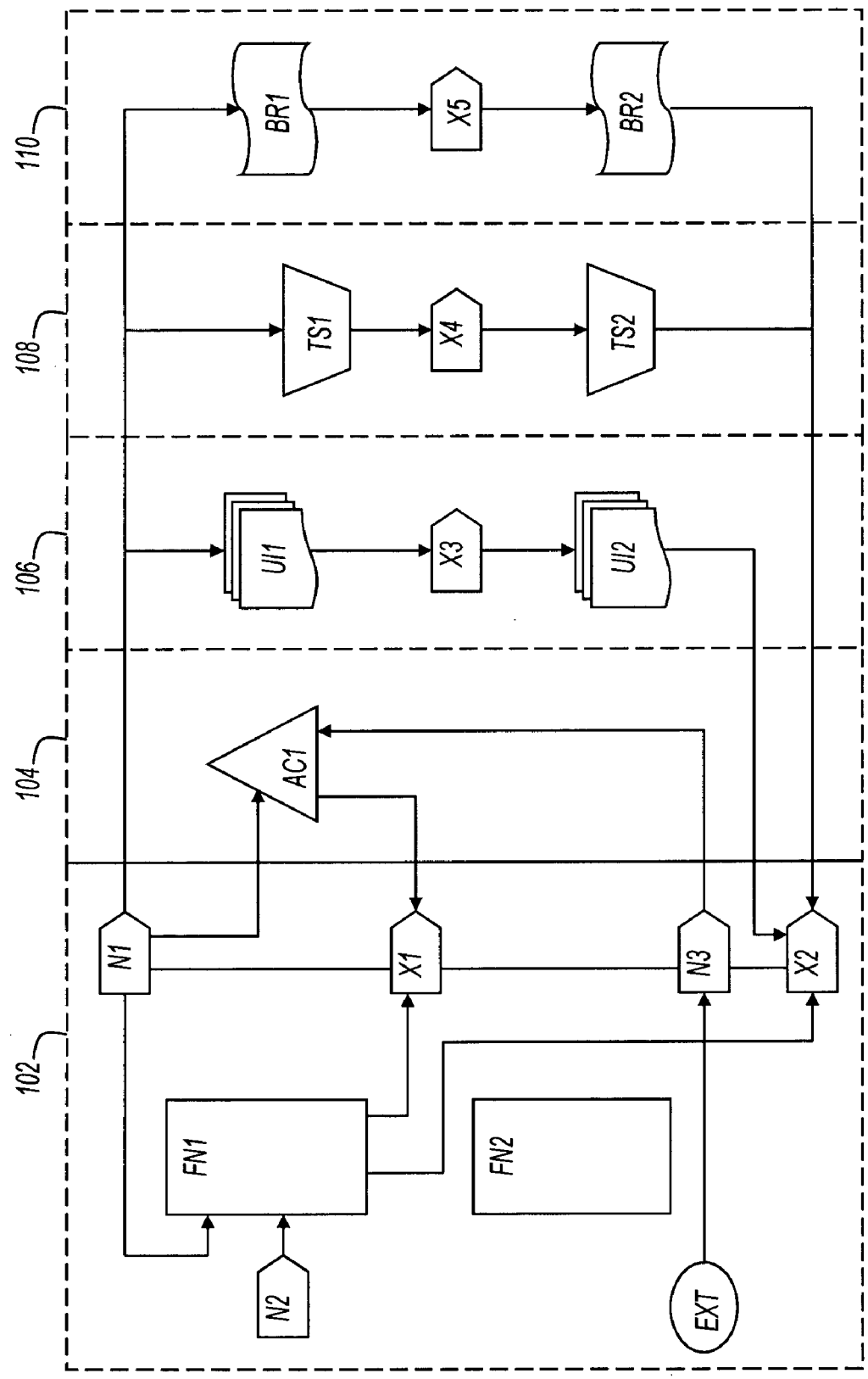
FIG. 1 shows modeling of nodes and events at different levels.

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Enterprise applications are systems that typically respond to either external stimulus or a system stimulus. To capture stimulus and stimulus response, various embodiments of the present invention model business systems using node/event pairs. Within each node/event pair, the event depicts the stimulus, the node depicts the response to the stimulus, and the response to the stimulus may lead to a new stimulus to the business system. The use of events and nodes to specify the behavior of the business systems at different levels ensures that there is coherence between the specifications at a process level, and that the coherence seamlessly percolates down to the system implementation.

In some embodiments of the present invention, application and business architecture is defined in the following five elements: (A) the business functions performed in an organization, (B) the activities performed inside a business function in response to happenings within and from outside the system, (C) the user interfaces used as a set to complete each of activities to capture and retrieve information, (D) the tasks or actions performed to fill, persist and retrieve various elements on the user interfaces, and (E) the business rules that govern each of such tasks.

Each of the five elements is represented by a data structure (in some embodiments these are, for example, five interrelated portions of a single larger data structure), into which data regarding requirements is entered.

Further example attributes include attributes for user interfaces, such as whether to use buttons, radio dials, fields, etc. Attributes for activities may include whether the activity is system or user initiated. A user initiated activity might appear as a menu item, but system initiated activity will not appear as a menu item. A function might be an external function, in which case it might be interfaced to another system for implementation of the function itself. These are just a very few examples of attributes that may be collected to help in producing enterprise software. The attributes are formulated to provide constraints, and to make planning and managing of implementation of the software easy to do. Others will be apparent to those of skill in the art, and may also be dependent on the type of processes being specified.

The requirements gathered from one or more business analysts (experts who understand the needs of the business organization) are constrained to a particular format suitable for entry into a data structure.

The standard architectural elements of such an approach, which correspond to the above five elements, then are (a) Business functions, (b) Business activities, (c) User interfaces or forms, (d) Tasks or actions performed on the user interface, and (e) Business rules.

Various embodiments of the present invention model high-level specifications for business systems as node/event pairs, or "stimulus response" at different levels. Each of the events may have different attributes, including, but not limited to: Exit/Entry event; Start/End/Intermediate event; Information Exchange or Transfer of Control.

FIG. 1 shows a diagram illustrating the modeling of nodes and events. In process flow level 102, each node depicts a business function. The entry and exit events specify the triggers that the function needs to respond to and in turn trigger other functions.

At the next level, activity level 104, nodes are activities. The activities and their associated events are modeled as node/event pairs. The external events that are triggered in the process level are modeled as entry events in activity levels and these form the menu items. The interactions of different activities depict the workflow in the system.

The nodes in the next level 106 are user interfaces and these form the basis for the visual interaction across and within functions. The transfers of control (TC) events depict the forward traversal of the user interface and the information exchange depicts the lookup screens traversals. Various node/event pairs may also be modeled at this level.

The nodes at the next level 108 are the user action and the events across these depict the user navigation scheme within the user interface, and the nodes at the next level 110 are the top level business rules which depict the flow of methods. These high-level flow business rules set the context for specifying the detailed business rules.

The events cutting across function are mapped as a collection of forward traversals across component boundaries and as the integration services calls across component boundaries and invocation of database methods across component boundaries. This way we have a strong correlation of the interactions at a higher level (coarse) and the interaction at a lower (detailed) level.

As shown in Table 1, below, the different entities that are specified at the high level specifications have a one to one correspondence at the subsequent stages.

TABLE 1

| High level requirements | System Implementation artifacts |
| --- | --- |
| Function | Component |
| Activity | Entry points (Menu Items). Workflow steps |
| User Interfaces | Pages, Forms, Screens |
| Tasks | User/system actions on the interface |
| Flow Business Rules | Methods Integration services, Data views and re-used procedures |
| TC events Visual | Forward links across UI |
| TC events Non-visual | Integration services, Procedure calls |
| IE events Visual | Help/look ups across UI |
| IE events Non-visual | Data views and procedures |

This methodology for requirements specifications provides a well defined trace ability at different stages of the software development life cycle, and strong semantics that ensure leakage across stages of the life cycle is reduced. Further, this methodology allows business users to specify requirements in a language that they are conversant with (e.g., functions and their interactions).

Figure 2:
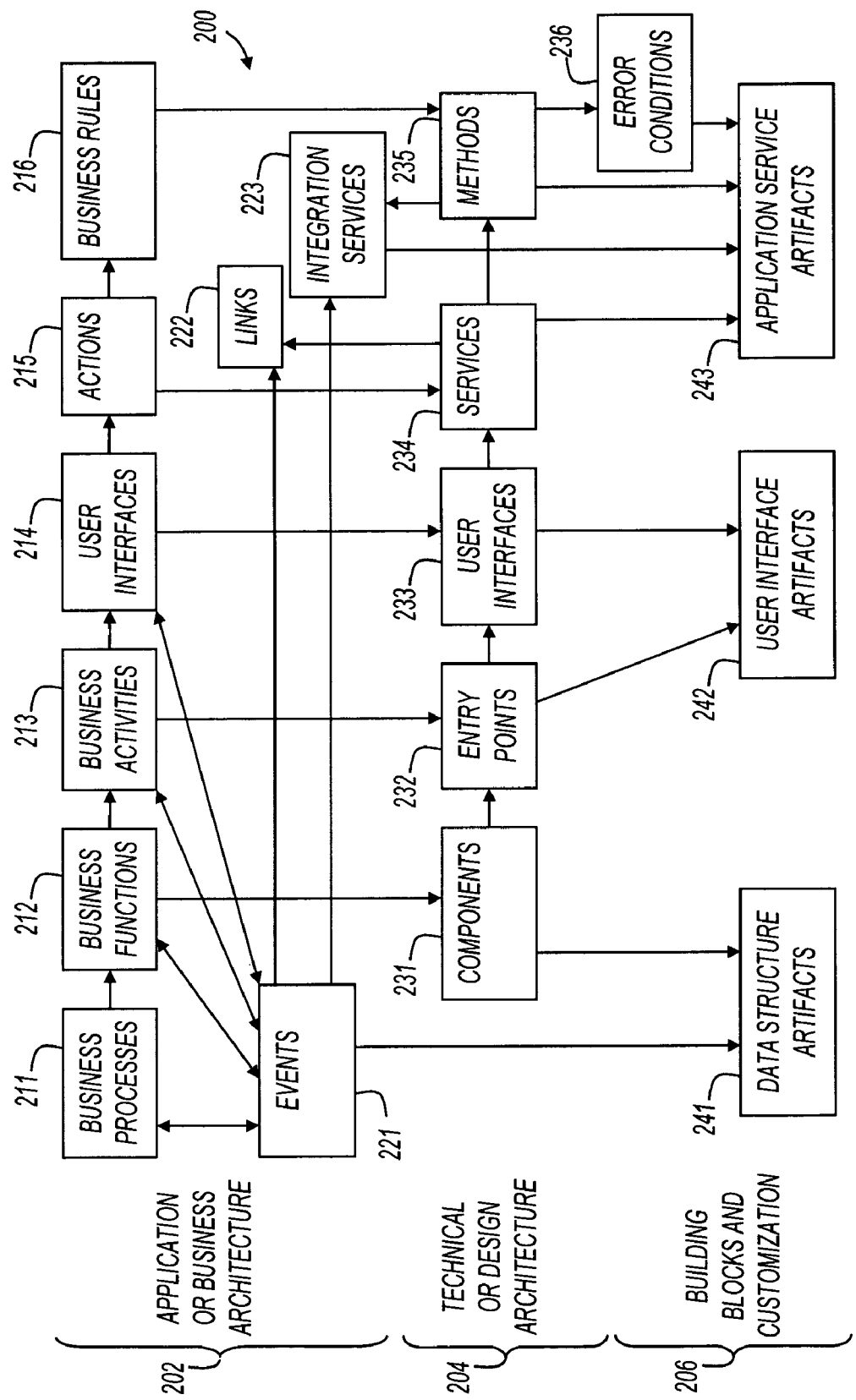
FIG. 2 is a schema for gathering requirements and engineering enterprise software.

FIG. 2 is a schema 200 for gathering requirements and for creating and managing enterprise software from the gathered requirements. Schema 200 includes multiple levels of abstraction of requirements. The first level 202 is an application or business architecture level. This level is used to define the high level requirements in context relevant syntax. The levels are stored in a database schema form in one embodiment, such that lower levels, progressing toward actual coding are linked to high levels. A second level 204 is used to represent a technical or design architecture of the first level. It serves as an intermediate link between the first level and a third level 206 represents the actual building blocks and technology specific customization.

The first level is a process expression level. It includes a plurality of elements or units, each of which stores various aspects of specifications derived from the requirements and software built to those specifications. In some embodiments, schema level 202 includes business processes 211 that define the requirements at a level compatible with the thinking processes of business-requirements experts. In some embodiments, business processes 211 are divided into a first five units including business functions 212, business activities 213, user interfaces 214, actions 215, and business rules 216.

An example of a business process might be purchase order processing for a business. Business functions 212 would include purchase requisitioning, approval and purchase order dispatch. Business activities might include an acknowledgement, get best quote, release purchase order. User interfaces may be defined in terms of show all pending purchase orders for approval, an approval screen, and others. Actions may include things like fetch next purchase order for approval, link to next page, send acknowledgement, or send rejection.

Business rules might include things like "if no request, tell user x". As can be seen, the first level 202 contains a textual description of the business or other process to be implemented by a computer system or otherwise electronically. The descriptions take the form of text that is very relevant to one who is designing the business process. In one sense, it is an abstract representation of the actual code that will be written, but in another sense, it separates the structure of the implementation from the expression of the process.

Business processes 211 and their associated events 221 represent the operational flow across the organization for which the software is being developed. Events 221, in the form of entry and exit events to the constituent functions, activities, and interfaces are connectors that define flow of control or interfaces between other units. Business activities and their associated events represent the operational flow across a unit within the organization. User interfaces 214 and their associated events 221 represent the specified interface map for the systems and software being developed.

Links 222 are formed from mapping of events 221 that represent interconnections, or from services 234. Integration services 223 are formed from mapping of events 221, business rules 216, or methods 236. A second five units represent the design architecture 204, and include, in some embodiments, components 231 that represent the basic software units of this approach, entry points 232, user interfaces 233, services 234, and methods 235. In some embodiments, each one of the first five units is mapped to a corresponding one of the second five units, e.g., business functions 212 are mapped to components 231, business activities 213 are mapped to entry points 232, user interfaces 214 are mapped to user interfaces 233, action 215 are mapped to services 234, and business rules 216 are mapped to methods 235. In some embodiments, error conditions 236 are provided for methods 235.

In some embodiments, the third level 206 contains building blocks and customization. Data structure artifacts 241 are generated from the events 221 and the components 231, user-interface artifacts 242 are generated from the entry points 232 and the user interfaces 233 of the second five units, and application service artifacts 243 are generated from the services 234 and the methods 235. In some embodiments, application service artifacts 243 are also generated from integration services 223 and error conditions 236.

Figure 3:
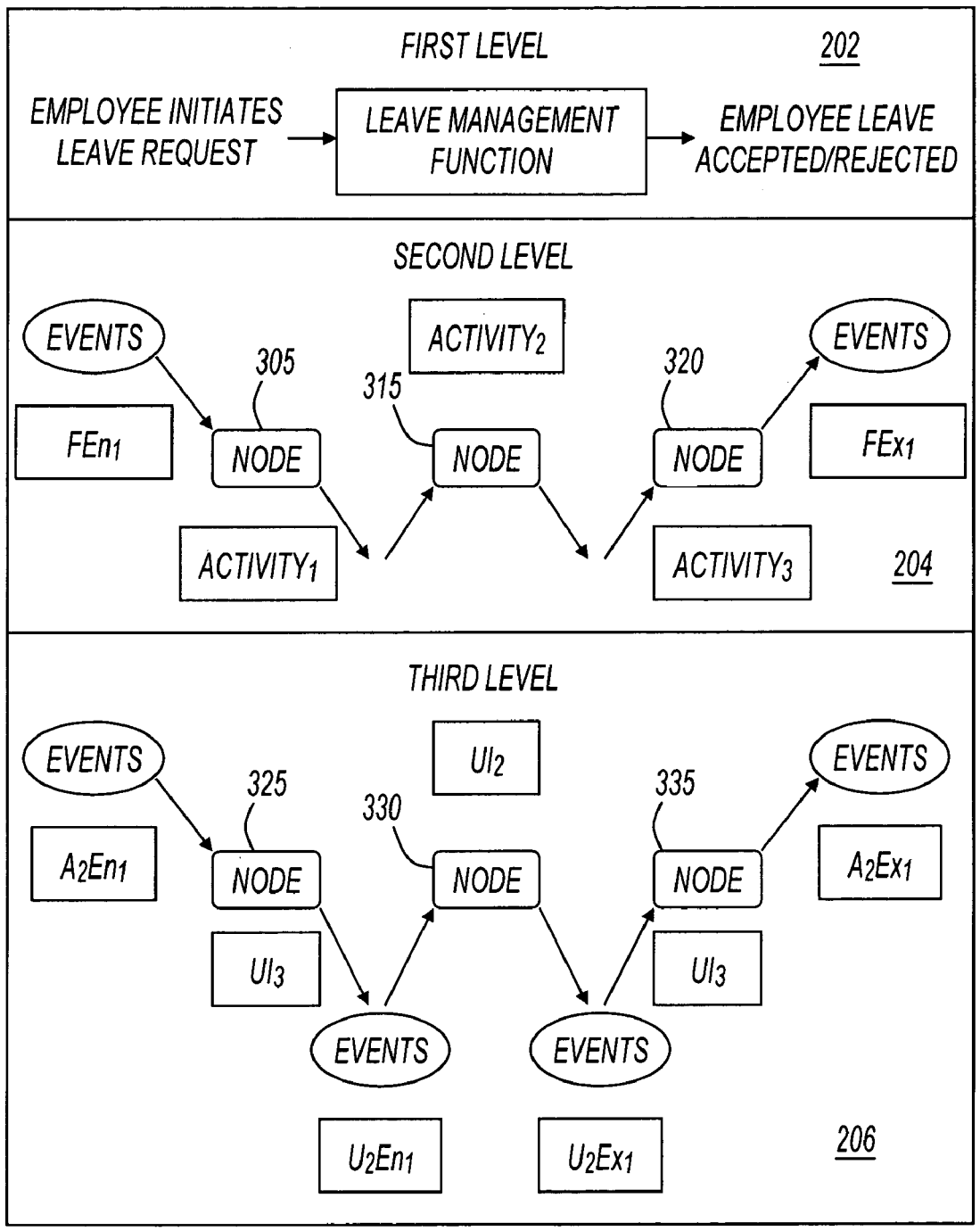
FIG. 3 is a chart of levels used in schema 200 for engineering the enterprise software.

FIG. 3 represents connections within and across levels, which are used as the software is being developed and engineered.

The first level corresponding to level 202 in FIG. 2 in the diagram creates a process flow by depicting entry events and exit events to the constituent functions from/to other functions in the same process or across processes. The standard connective elements (which connect the standard architectural elements) are events that are triggered by and/or handled by the various architectural elements (FEn1, FEx1, AEn1, AEx1, UEn1, UEx1) FEn1 represents an entry event handled by function 1. FEx1 is an exit event generated by function 1. AEn1 is an entry event handled by activity 1. Events are represented by ovals in FIG. 2. AEx1 is an exit event generated by activity 1. UEn1 is an entry event handled by User Interface 1. UEx1 is an exit event generated by User Interface 1.

The second level 204 for activity flow uses the entry event for the corresponding functions as the start event to create the set of activities and interactions thru events to reach the end events for the function. Each activity node 305, 315, and 320 is expanded along the same principles to depict the User Interface (UI) flow needed to complete the activity. The next level 206 represents tasks at task nodes 325, 330 and 335 on the UI and subsequently the business rules to be implemented for the tasks expanded. Events are again represented by ovals.

This approach creates a complete map of the system behavior up to the business rules/policies level and will be the driver for engaging with customers for whom the code is being written. The nodes translate to relevant nodes in engineering. The events that connect them are classified and translated to information-exchange events (these are implemented as UI look ups, and Data Look ups at the SP level for performing the validations), and transfer-of-control events (these are implemented as integration services across component boundaries and data updates or access across boundaries for local storage inside the component boundary).

Specification and Review Using Visual Interfaces

In various embodiments of the present invention, user interfaces created for software systems are used as a basis for providing the specification and review interface. In various embodiments, visual action elements that are included on the user interface are mapped to their associated behavioral implementations in a specification structure.

By utilizing the user interface (or prototypes of the eventual user interface) and the node/event mappings described above, various embodiments of the present invention provide a visual approach to the various phases of the software development life cycle. For example, in some embodiments, a visual overall process flow for a business system may be created using interactive rendering technologies such as "Flash™" from Macromedia in a web browser program. Further, in some embodiments, a review capturing mechanism may be provided against this visual flow. Some of these embodiments are described below under the heading "User Interface Review" and "Review Using Video."

In some of these embodiments, functions are used as interaction points to support creation of the activity flow within the function. Also in some embodiments, activities are used as interaction points to specify the user interface and the necessary navigation connections between the pieces. A traversable preview of the activities may be created using the specifications created so far, and from this point on, the user interfaces may be used as the interaction points to provide further specification and review support.

In some embodiments, active elements on the user interface are the anchor points for specifying and reviewing the business behavior, and in some embodiments, the active elements are the anchor points for specifying and reviewing the technical behavior. Active elements on a user interface may include: menu structures and associated element; actions recognized on the interface by the supporting technology (Button clicks, focus movement, etc.), and the like.

In some embodiments, using these elements that invoke the system behavior to specify the technical behavior is achieved by invoking the user interface preview under the relevant stages (e.g., requirements gathering, design) with the actions interpreted suitably. For example, invoking a 'button' action element using the traversable preview packaged for:

(1) Requirements gathering will present the necessary templates for creating the specification;

(2) Design specification will present the necessary templates for creating service specification to handle this action; and (3) Documentation creation will present the template for documenting the behavior for training.

The same approach may be used for collecting reviews against these specifications during various stages. In addition, in some embodiments, this approach is also implemented to progressively carry this to a functioning software piece to be tested using the interfaces again.

These mechanisms for specification and review using interfaces allow the software development life cycle to proceed while avoiding the need to switch between different conventions to create specifications. Further, review efficiency may be increased due to the awareness of the context and visibility into the progression of the process.

User Interface Review

As described above, various embodiments of the present invention model a software solution as a map of various stimulus response sequences that happen within the business environment. Any atomic identity in the software solution represents how the system would react to one or more stimuli both within the system and from the external world. The external world usually consists of end users who provide the required data for the process or interpret the data that is provided by the solution as a response to the end user's stimuli.

The interface that links the user and the system can be visual or non visual. Non visual could be sensory both for the end user and for the system. In majority of the situations, the interface will be visible. In a software solution this visual interface is termed as the User Interface (UI). User Interfaces may be presented in various mediums such as Graphical User Interfaces, Character Based User Interfaces, Reports and could be on a variety of devices. Reports may also be visualized as display-only user interfaces as they present data to the end users.

One challenge of software development is the accurate capture of user requirements for these interfaces. For any requirement to be effective and correct it should be adequately reviewed by the end user, and preferably from where the requirements originated.

Many end users are not tech-savvy and hence would not be exposed to various constituents of a User Interface requirement. An effective review of user interfaces benefits from a thorough understanding about the various user interface concepts and how they relate to the user interface the end user reviews. Posed by this problem, a typical end user may only perform a high level review with many untold assumptions, only to find during delivery and testing that the software solution does not address these assumptions. This is a major problem in the review process of any User Interface.

Another important hurdle to the end user involvement in the review process is the requirement of being connected with the software solution that the end user is expected to review. In addition, user(s) also need to have a system that enables him to communicate his review comments to the author of the system. In the past, this may have been in the form of some non-structured medium such as e-mail or word documents or manuscripts. All these hurdles reduce the end user involvement in the user interface review process which is critical for a successful solution delivery.

Various embodiments of the present invention use the concept of an offline prototype. A software solution provider may generate the user interface as understood from the functional requirements of the end user and package these user interfaces in a manner that can be shipped to the end user. The end user may then install the same on his local workstation and review it. Preliminary usage documentation may also be provided for the user's review. This documentation describes what the prototype is all about and how to navigate through the prototype. Since the prototype is structured clearly, the user needs to follow very few steps in getting started with the actual job of reviewing the user interface.

Figure 4:
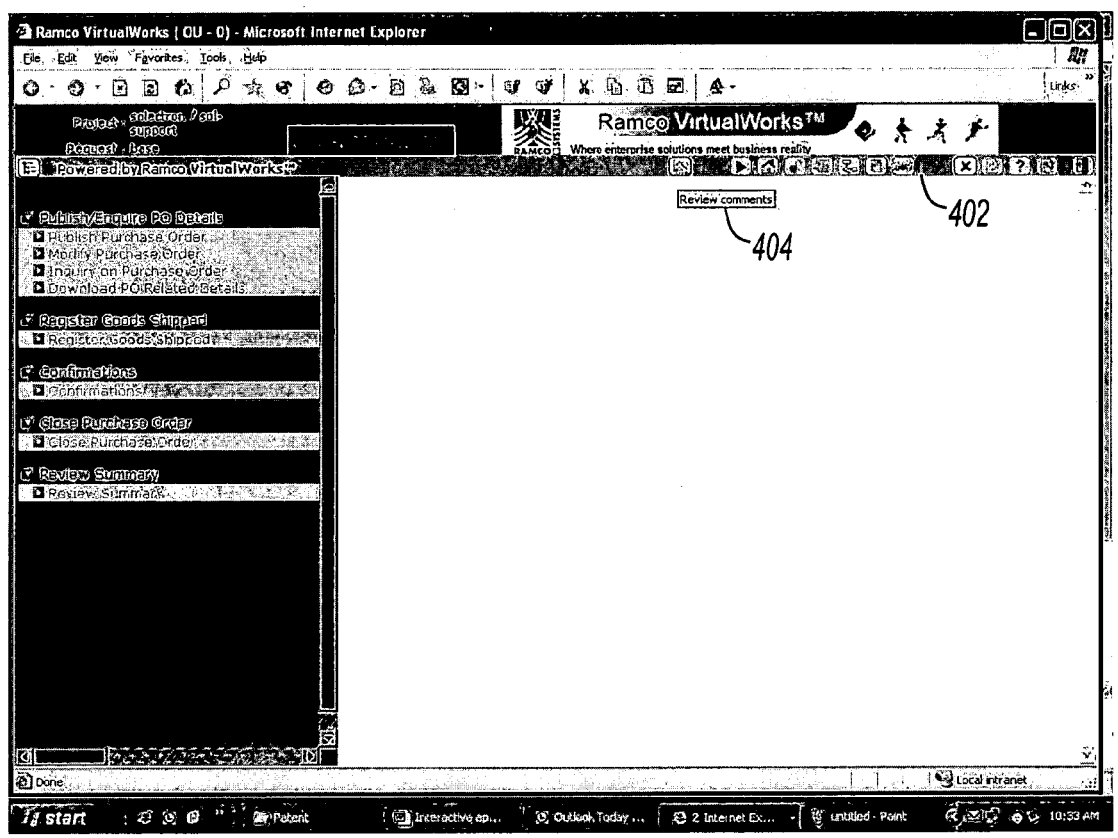
FIG. 4 shows a preview architecture of a prototype tool.

FIG. 4 shows a preview architecture of a prototype tool. The prototype tool shown in FIG. 4 provides a user interaction tool to display a user interface and to provide a mechanism for user interaction. For example, the prototype tool may display a user interface having action elements that are associated with descriptive elements in a database schema. The descriptive elements may provide any type of description for the associated action elements. For example, the descriptive elements may include requirements, specifications, documentation, or any other type of information associated with an action element.

In various embodiments of the present invention, the prototype tool may include a set of toolbars 402, each of which having a predefined functionality across the application. These toolbars may also have a short text field (tooltip) 404 associated with it that becomes visible as soon as the user hovers over these buttons using the mouse. The application can be launched in a web browser and does not require any special custom software to be installed.

In some embodiments, prototypes have a three frame hypertext markup language (html) architecture. The top frame includes the banner and the toolbars, and the toolbars are visible throughout the preview cycle. The left pane includes a list of various functions and their corresponding activities. On clicking of a particular node in the left pane, the corresponding information is displayed in the right pane of the browser document. The information displayed may be either the documentation about the particular node or a preview of the node. As shown in FIG. 4, the right pane is empty except for the tooltip 404.

Figure 5:
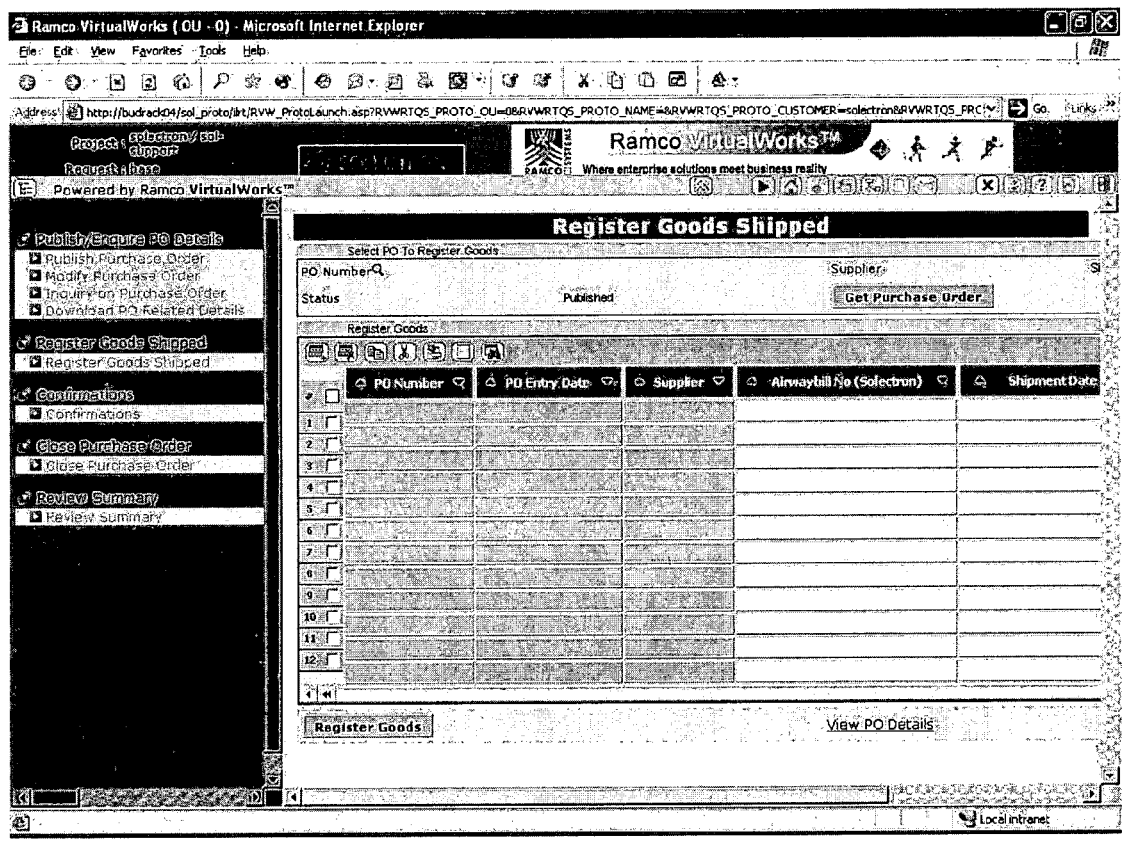
FIG. 5 shows a user interface in the preview architecture of FIG. 4.

FIG. 5 shows a user interface in the preview architecture of FIG. 4. In some embodiments, whenever the user clicks on an activity node in the left pane, the corresponding user interface prototype is launched on the right pane. This preview may be representative of the final deliverable that will be delivered to the end user. The preview may also include sample data that enables the end user to have a feel of the system with some relevant data.

Whenever the user hovers on any control of the user interface, the application displays a brief documentation on what purpose the particular control on the user interface is used for. For example, when the user hovers over a button, the short documentation on what the button does will appear.

Whenever the user wants to record a review comment for the user interface he is reviewing, he can click on a toolbar button designated for the purpose. This will launch a user interface which will intelligently get the current context and display the corresponding information. The user can record his review comments or modify the existing comments already recorded by him.

Figure 6:
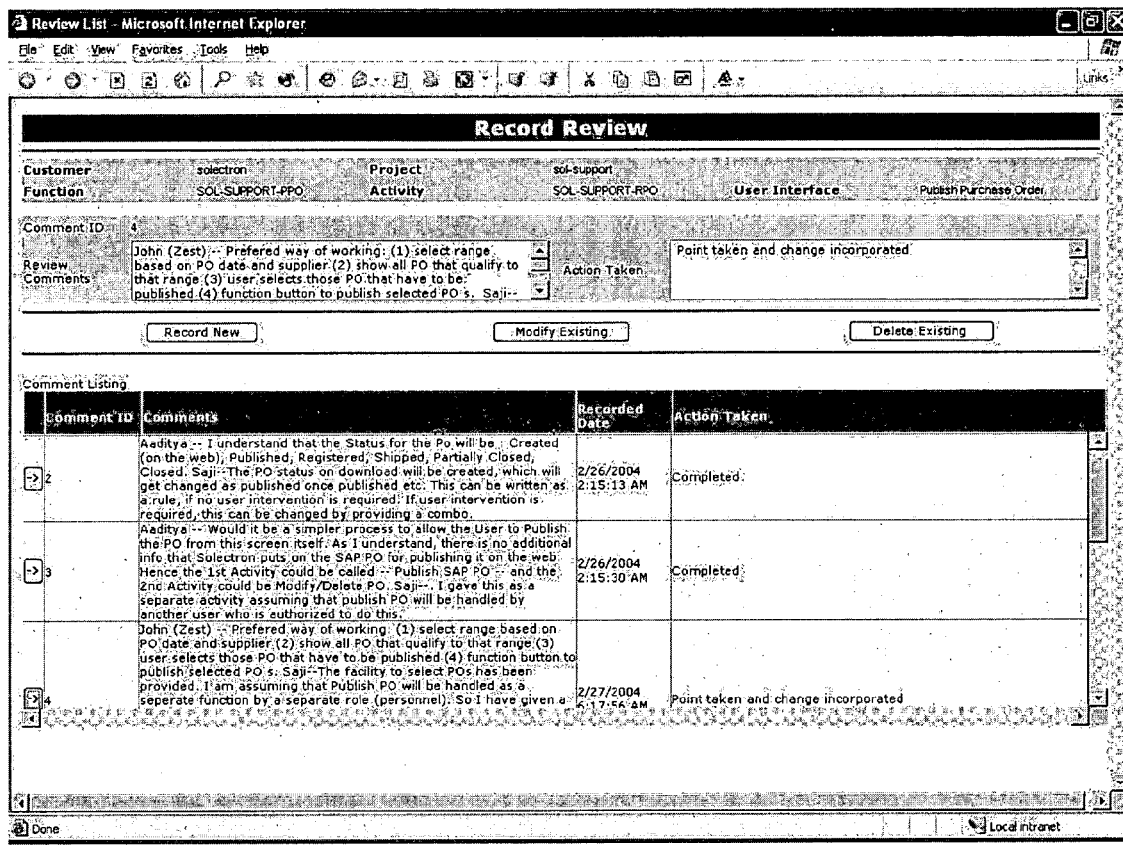
FIG. 6 shows user interface review comments.

FIG. 6 shows an interactive screen for user interface review comments. These review comments may be stored in the local environment in a structured fashion, and a facility may be provided to periodically move the data to the solution provider who will act on the review points and deliver the refined version of the user interface along with information on the action taken on the various review points recorded by the reviewer.

In various embodiments of the present invention, the user may also have a facility to view the list of all his review comments for the application. This will enable him to have an overall idea on the progress of his review.

The foregoing paragraphs have described a review process for user interfaces, although the present invention is not limited in this regard. For example, in some embodiments, other review processes, such as Design Review, Test Plan Review, Test Case Review and Testing Results Review are performed in the same or a similar manner.

The user interface mechanism described above enables a user to review the user interface without any need to be connected online with the solution provider, and removes the need of a specific format for recording user comments and reviewing the same with the action taken by the solution provider. This approach further provides an intuitive user interface which enables the user to get a gist of what the user interface is capable by just moving around in the screen.

In addition, this approach provides a seamless interface between the user interface and the documentation content that are prepared for the user interface, and results in a significant time saving in the entire software development lifecycle for the solution developed.

Streaming Video

In various embodiments of the present invention, a solutioning process collects event-based inputs from the users to enable them to provide their requirements clearly. The actors on these events are nodes that enable flow of information between these events. Nodes are the hierarchy followed in the business architecture for an application. In some embodiments, a source file such as an Excel file is uploaded to a modeling tool such as Aries to provide user input to the solutioning platform. Other example source file types include XML. The advantage of this over the use of an Aries-like modeling tool alone is that cluttering of lots of events is avoided and the user has the facility to pick up individual process, function or activity and look at the flow through Flash™ as a movie. This depicts the cycle of work. This way of representation is very clear and easy to understand. There is an offline facility provided where the user is likely to save Flash™ movies and view them one by one at his convenience.

Semantics of defining events that need to be understood for Flash™ preview are provided here. Events are direction based and are given as entry and exit events. Exit events typically trigger the action to be performed while entry Events handles the event having the same event name, and perform the action. Execution sequence is an attribute of every event that has options Start, Intermediate and End. Start and intermediate options are provided at the entry events. Intermediate and End are provided at the exit events. Flow type is another attribute captured having options such as external, "information exchange" and "transfer of control". Entry events are associated at all levels excepting the process and activity flow. There is a provision made for creation of external events that are entry points to the process. Typically all these external events at the entry level are of execution sequence start. At the exit level the execution sequence is end. This shows the control movement in and out of process boundary. Conversion of this execution sequence is allowed for events and flow type with minimal rules to ensure proper documentation. A Short Event Description is also provided to ensure Round Trip to the process modeling tools like Aries from our platform model. Display of different colors based on different attributes of events and nodes may be provided in the preview.

Figure 7:
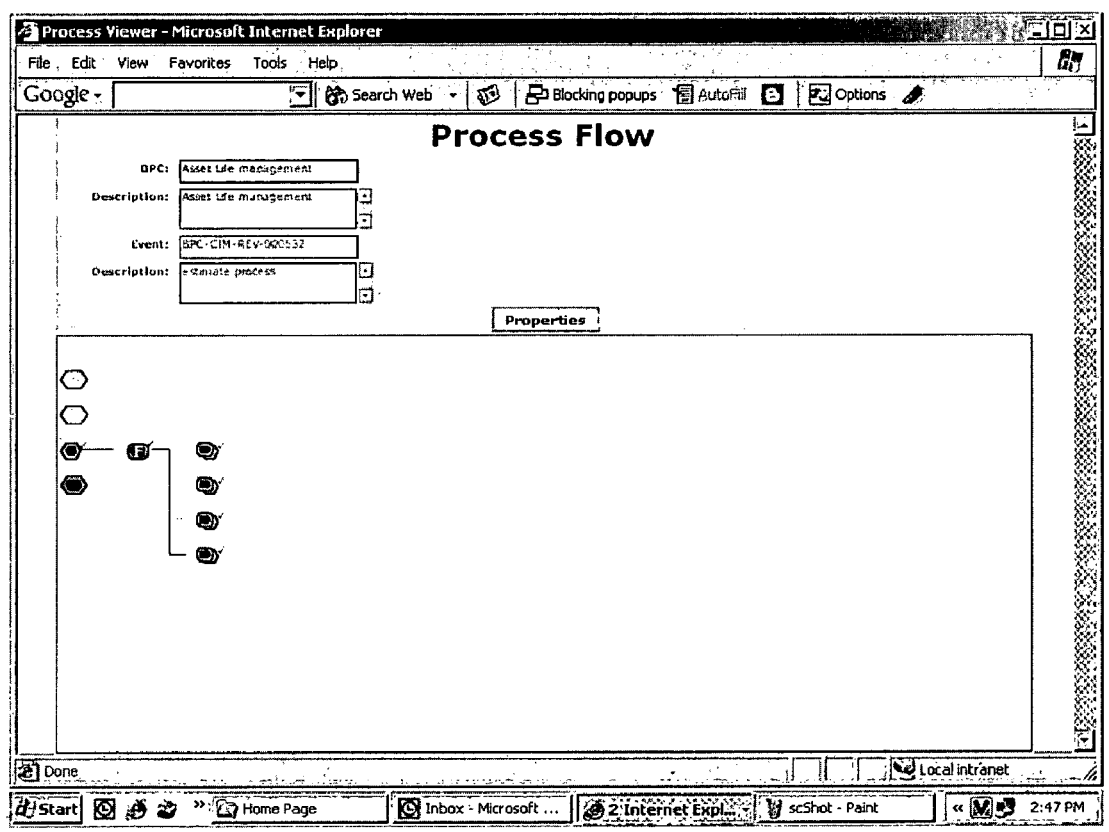
FIG. 7 shows a tool to display an animation of a stimulus response sequence.

FIG. 7 shows a tool to display an animation of a stimulus response sequence. The animation may utilize any suitable tool, including Flash™. Flash™ launches successfully only when there is at least one start event in the chosen Process, Function or Activity. On "mouse move over" of start events, the event description and the event name is displayed in the header area. This is provided in addition to the process, function or activity for which the review is happening. There is also a display of the flow type of the event at this time. There is a properties button in the header which on clicking will launch a dialog window and display the attributes of the event namely flow type, execution sequence and the short event description. There could be multiple events which clearly establish the multiple entry points to the parent node in consideration. In activity level, all entry points do begin with integration activity as the start node. Similarly now the header will display the details of the node and on mouse move over the node abbreviation and name are displayed. Choosing properties at this level shows the same as attributes of the node namely the description, abbreviation and unique name. On click of the node, all the exit events that arise out of this node are available to the user and similar pattern on mouse move over or on click to another node is available. This way of viewing or reviewing the flow or preview is an unique, user friendly and less complicated process then looking this as a complex diagram. Image of the user interface that collects the data is provided for the flow at user interface level. As a part of platform enhancement provision for another entry point for user interaction to collect requirements is to be provided. This can be made offline with security procedures, to upload the information collected offline, to platform solutioning process storage, for everyone to use and act accordingly in the project.

Delivering Software System Documentation According to Organizational Standards

A "model based environment" refers to the approach and implementation by which every significant part of a software development lifecycle can be modeled as data and persisted with capabilities of enabling user to perform the various steps in the software development lifecycle. This persisted data may be used by the downstream processes for their activities thereby ensuring that all the relevant data that is captured by upstream processes are used in the downstream processes without any significant loss of information.

The significant processes in a model based development environment include Solutioning, Engineering, Rollout, and Planning & Control.

Data is captured as a part of the model throughout the software development lifecycle. As a part of any software solution, documents need to be provided at various stages to the end users for documentation and review. Each end user would like documents as per their internal organizational standards, which may vary between organizations. The organization providing solutions to customers should gear itself towards its capability to assimilate the entire information and present them as required by the end user.

This makes it a challenge to deliver requirements document as per the end user's organization standards. The technologies and tools used for delivering and reviewing these documents call for additional training and expertise on these tools and technologies. This results in the consumption of extra resources for preparing these documents.

In various embodiments of the present invention, the model based environment includes information about all the artifacts and their interactions. Documentation may be captured in the model against each of these artifacts in various dimensions. For example, whenever documentation is captured for a Solutioning artifact, the documentation may be captured in the following categories:

Process Interaction Information
End user Documentation
Documentation for Engineering
Usage scenarios
Alternate Courses
Cardinality Each or a set of these categories are aimed at a particular set of users. Only the format in which the document needs to be prepared varies from user to user.

Similarly, in the design process the documentation is captured for the various entities in various dimensions. Depending on the end user requirement and the process requirement, this documentation is provided. A typical set of documentation captured in the Engineering Process may include Business Object Documentation
Schema Level documentation
Service documentation
Method documentation
Stored Procedure Documentation This documentation is useful both for the end users who would like to maintain the software solution and also to the downstream process owners for performing their activities effectively.

Any documentation that needs to be generated will address a specific need of the end user. As the end user need changes, the documentation generation approach alone needs to change. This will not have any impact on process execution.

Each of the processes would require documentation in various different ways. The differentiation in the requirements would be both in terms of methodology and in terms of technology platforms. The end user would have standardized on certain representation tools as a standard in their organization. This brings in a need for rendering the documentation readable by the tools used by the end users.

The type of tools used varies depending on the various business processes. This approach has the ability to generate the documentation in all these methodologies.

Table 2 shows a sample list of such software system documentation.

TABLE 2

| Process | Deliverable | Supported Tool |
| --- | --- | --- |
| Solutioning | Use Case Diagram | Rational Rose |
| | Event Based Process Chain | Aris from IDS SCHEER |
| | Process Flow Diagram | Microsoft Visio |
| | Process Documentation | Microsoft Word |
| | Component Data Sheet | Microsoft Word, Excel |
| | Process flow Diagram | Macromedia Flash |
| Engineering | Class Diagram | Rational Rose |
| | Entity Relationship Diagram | ER Win |
| | Data Flow Diagram | Microsoft Visio |
| | High Level Documentation | Microsoft Word |
| | Low Level Documentation | Microsoft |
| | Schema Documentation | Microsoft Excel |
| | Component Datasheet | Microsoft Excel |
| Rollout | Deployment Topology | Microsoft Visio |
| | User Role Documentation | Microsoft Word |
| | Component Data Sheet | Microsoft Excel |
| Planning and Control | High Level Plan | Microsoft Project |
| | Detailed Plan | Microsoft Project |
| | Plan status report | Microsoft Word |
| | Scheduling and Tracking Reports | Microsoft Excel |
| | Utilization and Efficiency Reports | Microsoft Excel |

This list does not limit the capability of the approach to generate further documentation as and when the need arises. The only effort that would be required will be to map the data captured in the process to the end user requirements. This effort will not be significant.

This approach provides a high degree of flexibility for the solutions provider to satisfy the end user requirements in terms of documentation, and further, eliminates the need for the end user to get used to a standard set of documentation generated by the system. The end user can concentrate on the contents of the document rather than the format of the document.

This approach is future ready as any new delivery format only involves identifying the translation semantics and the technical requirements for performing this translation. This gives a great flexibility for both the solutions provider and the end user of the software solution.

Figure 8:
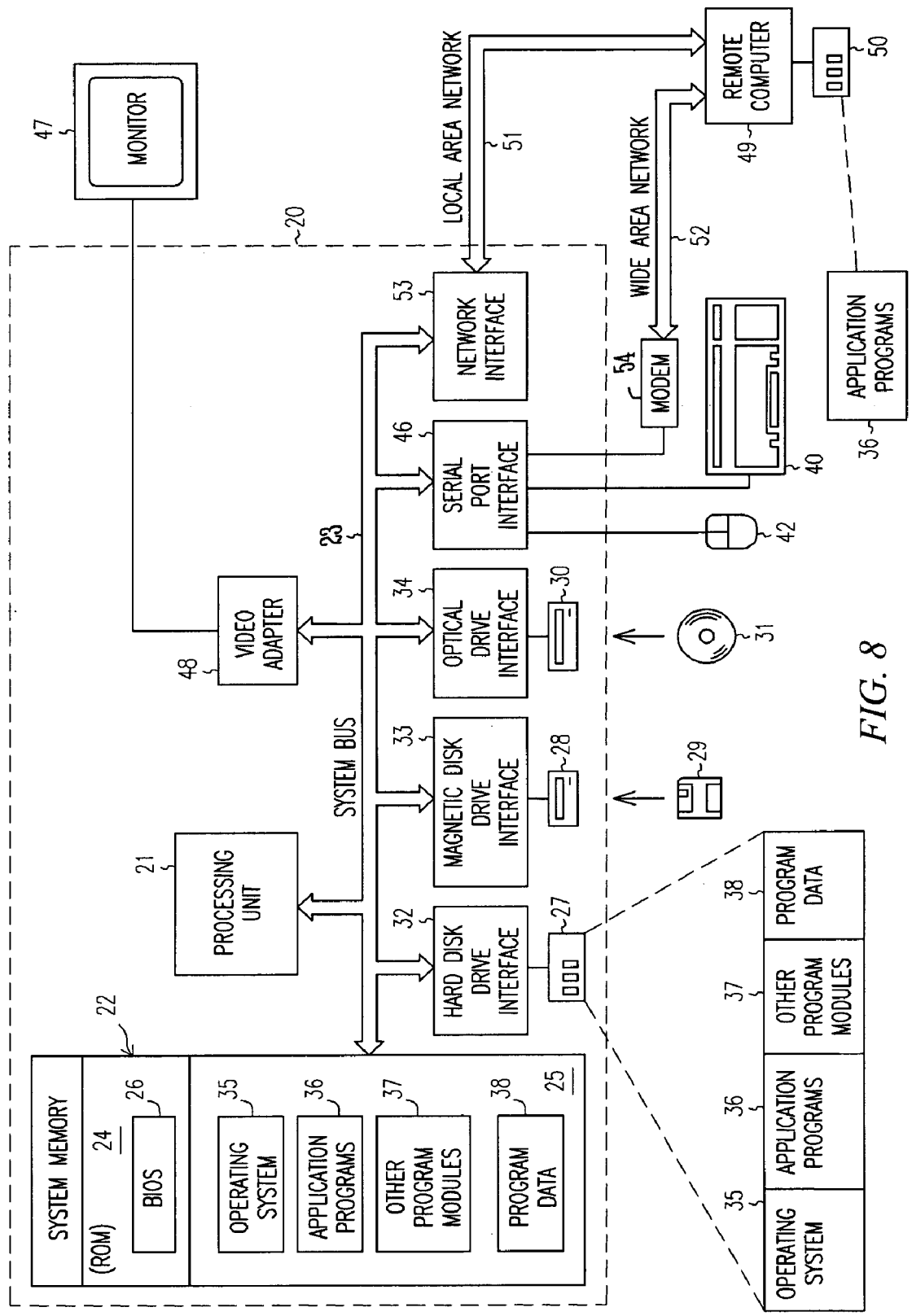
FIG. 8 is a schematic block diagram of an exemplary information-processing system that can be used in conjunction with various embodiments of the present invention.

FIG. 8 is an overview diagram of a hardware and operating environment in conjunction with which various embodiments of the invention may be practiced. The description of FIG. 8 is intended to provide a brief, general description of suitable computer hardware and a suitable computing environment in conjunction with which some embodiments of the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/O remote processing devices that are linked through a communications network. In a distributed computing environment, program modules may be located in both local and remote memory storage devices.

In the embodiment shown in FIG. 8, a hardware and operating environment is provided that is applicable to any of the information systems and tools shown in the other Figures.

As shown in FIG. 8, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. For example, a user prototype tool may be implemented as one or more program modules. Also for example, a tool to display an animation of a stimulus response sequence may be implemented as one or more program modules.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above relative to the computer 20, although only a memory storage device 50 has been illustrated. The logical connections depicted in FIG. 8 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

In the foregoing detailed description of embodiments of the invention, various features are grouped together in a single embodiment for the purpose of streamlining the disclosure. This method of disclosure is not to be interpreted as reflecting an intention that the claimed embodiments of the invention require more features than are expressly recited in each claim. Rather, as the following claims reflect, inventive subject matter lies in less than all features of a single disclosed embodiment. Thus the following claims are hereby incorporated into the detailed description of embodiments of the invention, with each claim standing on its own as a separate embodiment. It is understood that the above description is intended to be illustrative, and not restrictive. It is intended to cover all alternatives, modifications and equivalents as may be included within the spirit and scope of the invention as defined in the appended claims. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein," respectively. Moreover, the terms "first," "second," and "third," etc., are used merely as labels, and are not intended to impose numerical requirements on their objects.

What is claimed is:

1. A method to specify and review software development of an enterprise application using visual interfaces, comprising:

modeling business requirements of a business process in the enterprise application as business functions, business activities, forms, tasks, and business rules in a first level of a schema, wherein the business requirements are modeled as the business functions implemented in the business process, the business activities implemented in each of the business functions, the forms implemented for each of the business activities, the tasks implemented in each of forms, and the business rules implemented in each of the tasks;

modeling components to implement each of the business functions, entry points to implement each of the business activities, user interfaces to implement each of the forms, services to implement each of the tasks, and methods to implement each of the business rules in another level of the schema, wherein the entry points are action elements that are used to invoke the user interfaces;

defining events that define behavioral implementation elements between each of the business functions, each of the business activities, and each of the user interfaces in the schema, and wherein each of entry events of the events is a stimulus that triggers a business function, a business activity, or a user interface and each of exit events of the events is a response from the respective business function, business activity, or user interface to the stimulus;

generating a user interface artifact of the enterprise application comprising action elements using the modeled business requirements, components, entry points, user interfaces, services, methods, and defined events in the schema, wherein the action elements are mapped with respective behavioral implementation elements in the schema; and providing a mechanism in the generated user interface artifact to specify and review the action elements and associated behavioral implementation elements of each of the user interfaces, wherein providing the mechanism in the generated user interface artifact to specify and review the action elements comprises:

providing a toolbar with functionality to record user comments regarding the action elements and behavioral implementation elements; and providing an animated view of stimulus response behavior of the action elements and behavioral implementation elements.

2. The method of claim 1 wherein providing the user interface artifact comprises providing a prototype of the user interface artifact in a web browser.

3. The method of claim 1 further comprising: providing a mechanism to document the user interface artifact using the user interface artifact.

4. The method of claim 1 wherein the animated view of the stimulus response behavior comprises animation using a Flash™ program.

5. A system comprising:

a processing unit; and memory coupled to the processing unit, wherein the a memory comprises:

a database schema to map visual action elements with corresponding behavioral implementation elements, wherein the database schema comprises:

business requirements of a business process in an enterprise application modeled as business functions, business activities, forms, tasks, and business rules in a first level of the database schema, wherein the business requirements are modeled as the business functions implemented in the business process, the business activities implemented in each of the business functions, the forms implemented for each of the business activities, the tasks implemented in each of forms, and the business rules implemented in each of the tasks;

components to implement each of the business functions, entry points to implement each of the business activities, user interfaces to implement each of the forms, services to implement each of the tasks, and methods to implement each of the business rules modeled in another level of the database schema, wherein the entry points are the visual action elements that are used to invoke the user interfaces; and events that define the behavioral implementation elements between each of the business functions, each of the business activities, and each of the user interfaces in the database schema, and wherein each of entry events of the events is a stimulus that triggers a business function, a business activity, or a user interface and each of exit events of the events is a response from the respective business function, business activity, or user interface to the stimulus;

a user interaction tool to generate and display the visual action elements as part of a user interface, and to specify and accept review comments related to the visual action elements, wherein the user interface is generated using the modeled business requirements, components, entry points, user interfaces, services, methods, and defined events in the schema, wherein the visual action elements are mapped with the corresponding behavioral implementation elements in the schema; and a tool to display an animated representation of a stimulus response behavior of the visual action elements, accepted comments related to the visual action elements and the behavioral implementation elements.

6. The system of claim 5 wherein the user interaction tool to display the visual action elements and accept comments comprises software to run in a web browser.

7. The system of claim 5 wherein the user interaction tool to accept comments comprises a mechanism to accept requirements for the behavioral implementation elements.

8. The system of claim 5 wherein the user interaction tool to accept comments comprises a mechanism to accept documentation for the user interface.

9. The system of claim 8 further comprising a tool to translate the documentation into a user specified format.

10. The system of claim 5 wherein the schema models the visual action elements and behavioral implementation elements as node/event pairs.

11. An apparatus with a computer-readable medium having information stored thereon, the information comprising:

a database schema having descriptive elements for action elements, wherein the descriptive elements include documentation, and wherein the database schema comprises:

business requirements of a business process in an enterprise application modeled as business functions, business activities, forms, tasks, and business rules in a first level of the database schema, wherein the business requirements are modeled as the business functions implemented in the business process, the business activities implemented in each of the business functions, the forms implemented for each of the business activities, the tasks implemented in each of forms, and the business rules implemented in each of the tasks;

components to implement each of the business functions, entry points to implement each of the business activities, user interfaces to implement each of the forms, services to implement each of the tasks, and methods to implement each of the business rules modeled in another level of the database schema, wherein the entry points are visual action elements that are used to invoke the user interfaces; and events that define behavioral implementation elements between each of the business functions, each of the business activities, and each of the user interfaces in the database schema, and wherein each of entry events of the events is a stimulus that triggers a business function, a business activity, or a user interface and each of exit events of the events is a response from the respective business function, business activity, or user interface to the stimulus;

a user interaction tool to generate and display a user interface having the visual action elements and allow a user to interact with the descriptive elements, wherein the user interface is generated using the modeled business requirements, components, entry points, user interfaces, services, methods, and defined events in the schema, wherein the visual action elements are mapped with respective behavioral implementation elements in the schema; and a tool to display an animation of a stimulus response sequence involving the visual action elements and user's interaction with the descriptive elements.

12. The apparatus of claim 11 wherein the visual action elements include a menu.

13. The apparatus of claim 11 wherein the visual action elements include buttons.

* * * * *